March 17, 1931. J. C. L. RITTER, JR 1,796,876
LANDING AND LAUNCHING MECHANISM FOR AIRCRAFT
Filed Nov. 5, 1928   4 Sheets-Sheet 1
Fig. 1.
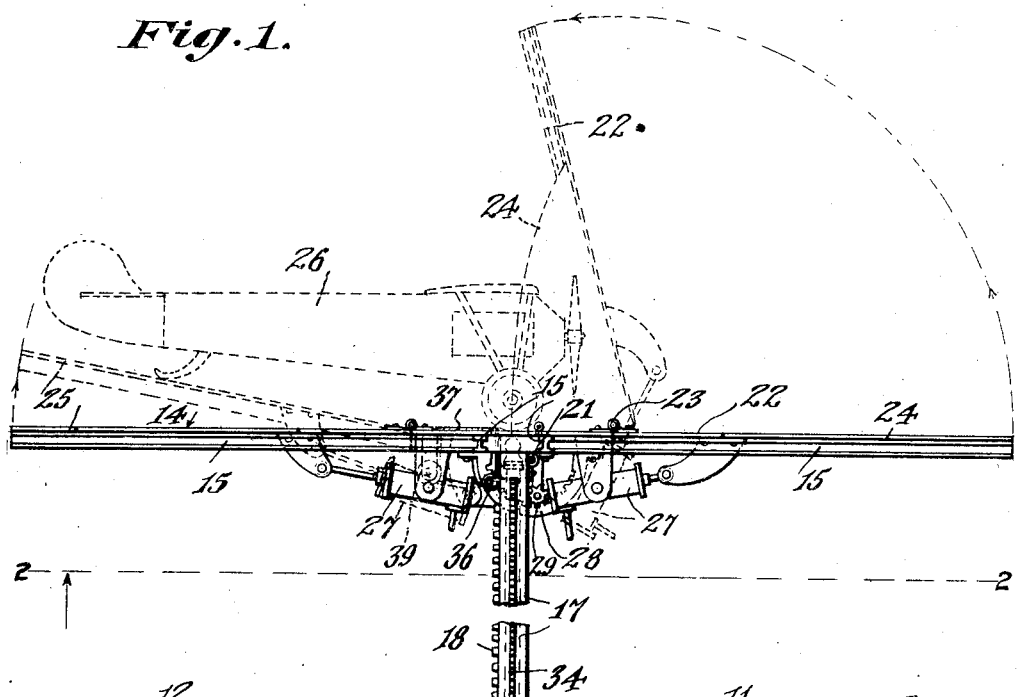
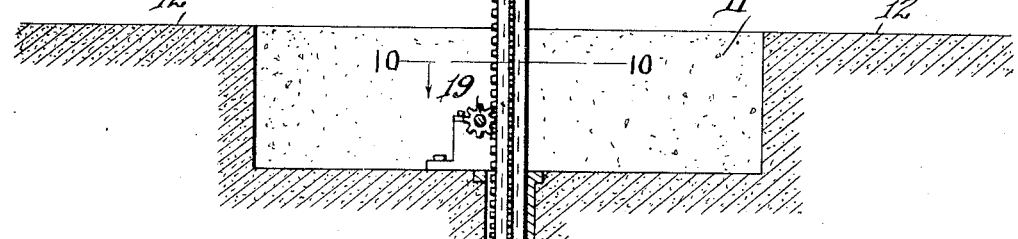
Fig. 10.
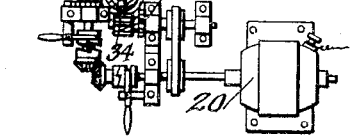
INVENTOR.
John C. L. Ritter Jr.,
BY
Bernard F. Garvey
ATTORNEY March 17, 1931.  J. C. L. RITTER, JR  1,796,876
LANDING AND LAUNCHING MECHANISM FOR AIRCRAFT
Filed Nov. 5, 1928  4 Sheets-Sheet 2

John C. L. Ritter Jr., INVENTOR.

BY Bernard J. Farvey
ATTORNEY.

March 17, 1931. J. C. L. RITTER, JR 1,796,876
LANDING AND LAUNCHING MECHANISM FOR AIRCRAFT
Filed Nov. 5, 1928 4 Sheets-Sheet 3
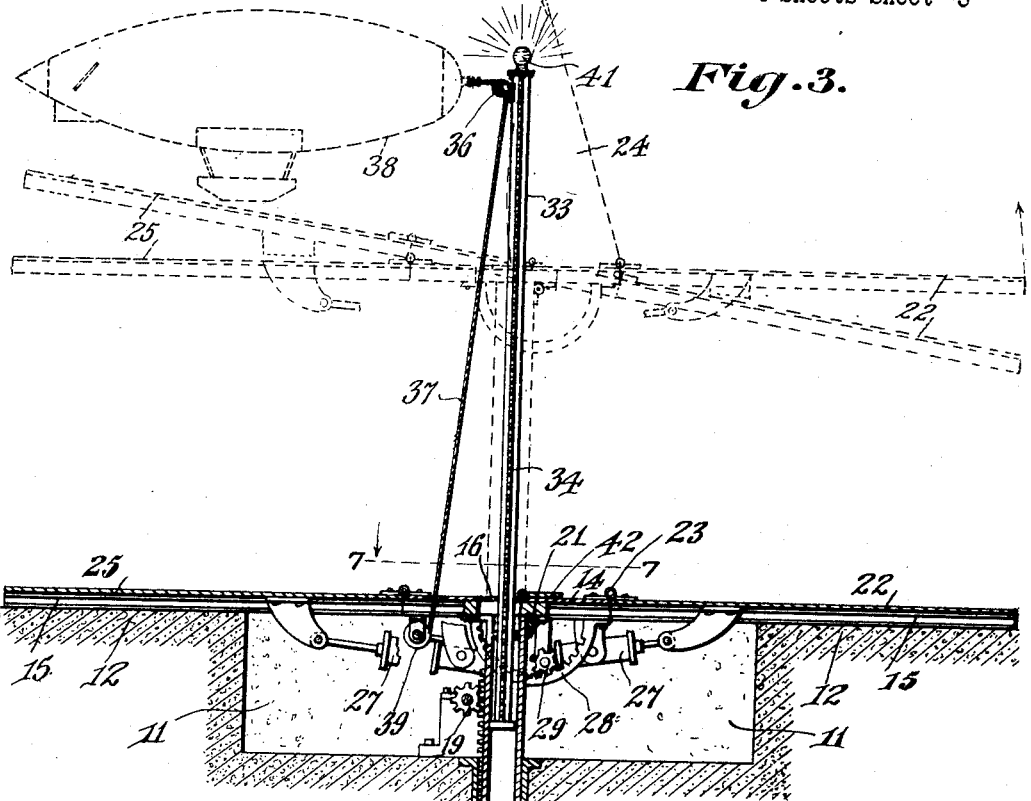
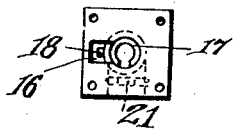
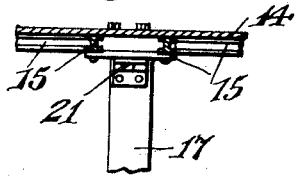
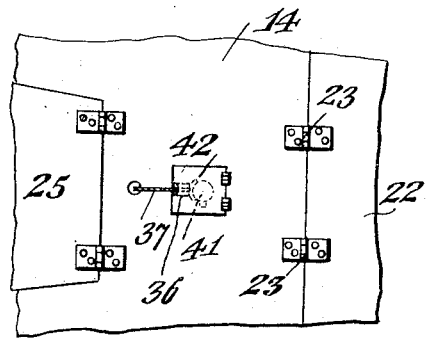
INVENTOR.
John C. L. Ritter Jr.,
BY
Bernard F. Harvey
ATTORNEY March 17, 1931.        J. C. L. RITTER, JR        1,796,876
LANDING AND LAUNCHING MECHANISM FOR AIRCRAFT
Filed Nov. 5, 1928        4 Sheets-Sheet 4
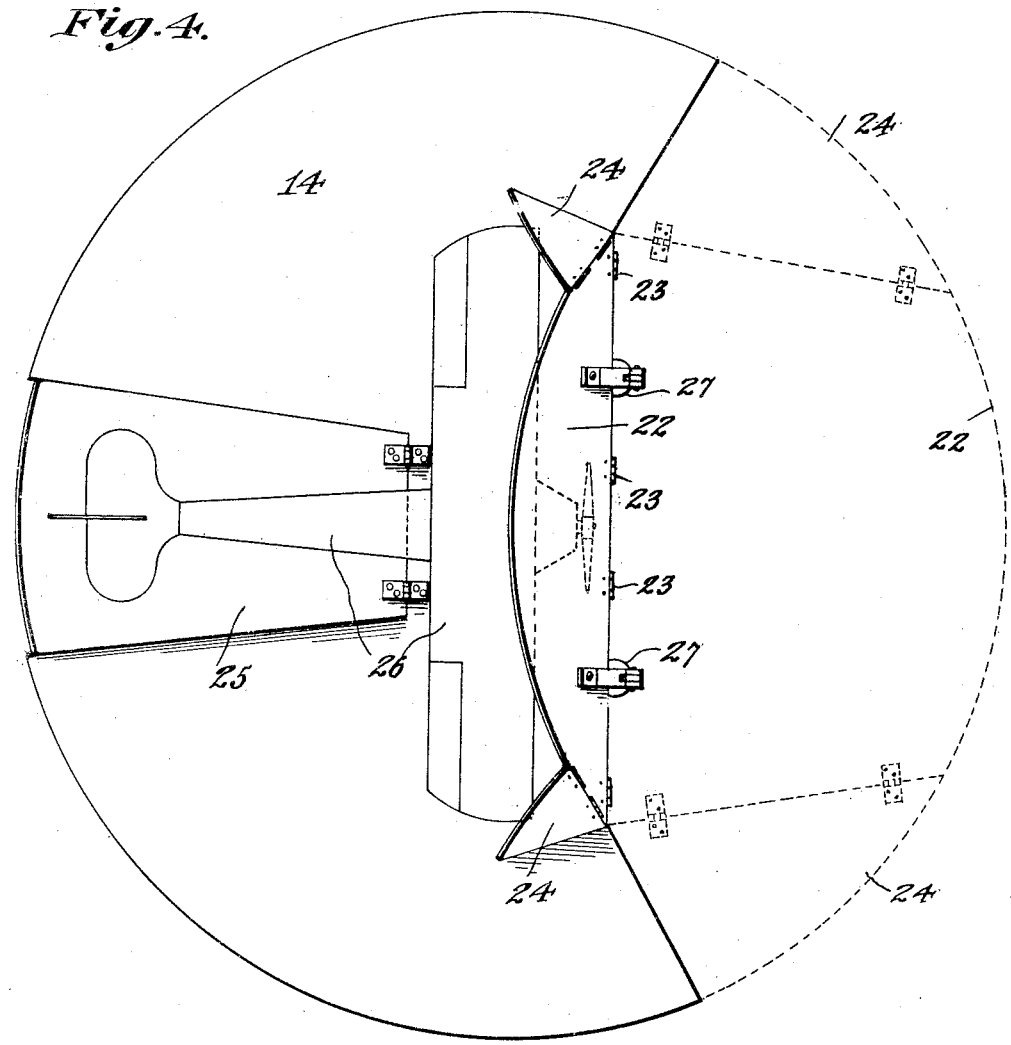
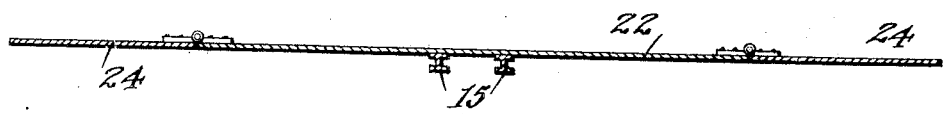
John C. L. Ritter Jr., INVENTOR.
BY
Bernard F. Darwey
ATTORNEY.

Patented Mar. 17, 1931

1,796,876

UNITED STATES PATENT OFFICE

JOHN C. L. RITTER, JR., OF WASHINGTON, DISTRICT OF COLUMBIA

LANDING AND LAUNCHING MECHANISM FOR AIRCRAFT

Application filed November 5, 1928. Serial No. 317,191.

The present invention consists of a landing and launching mechanism for air crafts, including both heavier-than-air and lighter-than-air aircrafts, including gliders.

Objects of the invention are to provide mechanism for supporting and anchoring an aircraft in such a manner that it will be unaffected by wind pressure; to provide anchoring or mooring mechanism which will positively retain an aircraft from displacement in any kind of weather and will eliminate use of hangars; to provide a support or structure from which an aeroplane can take off without the customary preliminary run; to provide mechanism which is normally mounted on the ground for the reception of a landing aeroplane, but may be elevated and tilted to permit the aeroplane to take off in a facile and expeditious manner, without coming in contact with the ground; and to provide mechanism which is relatively simple in construction and may be installed at a minimum expense.

Other objects of the invention will be apparent from the following description of the present preferred form of the invention, taken in connection with the accompanying drawings, wherein—

Figure 1 is an elevational view of a landing and launching mechanism constructed in accordance with the present invention, illustrating its application with a heavier-than-air craft, parts thereof being shown in section and parts fragmentarily;

Figure 3 is a vertical sectional view of the invention, illustrating the application of the same with a lighter-than-air craft;

Figure 4 is a top plan view of the device, showing a heavier-than-air craft mounted thereon, showing the wind deflector in opposite position;

Figure 5 is a detailed sectional view taken on the line 5—5 of Figure 2, looking in the direction of the arrow;

Figure 7 is a detail fragmentary top plan view of the table, showing a portion of the hinged wind baffle or deflector, a portion of the hinge support for the aft end of the aeroplane and the hinge closure for engagement over the mast opening of the table;

Figure 8 is a detail fragmentary bottom plan view of the table bearing or block, showing the manner of mounting the mast therein;

Figure 9 is a detail fragmentary sectional view of the table, illustrating the manner of hingedly mounting the same on one of the telescopic base sections; and Figure 10 is a cross-sectional view taken on the line 10—10 of Figure 1, looking in the direction of the arrow and showing to advantage the mechanism used for hoisting the table.

As shown to advantage in Figures 1 and 3, the device of the present invention contemplates the use of a pit 11, made of concrete or the like, which is countersunk in the ground 12 in an obvious manner. The pit 11 may be of any desired size and configuration to conveniently accommodate the mechanism hereinafter described. The pit is provided with a center opening, which is adapted to receive the upper end of a tubular base 13 which extends down into the ground for a predetermined distance. The base 13 may be of any desired size and constructed from any desired material.

Figure 2:
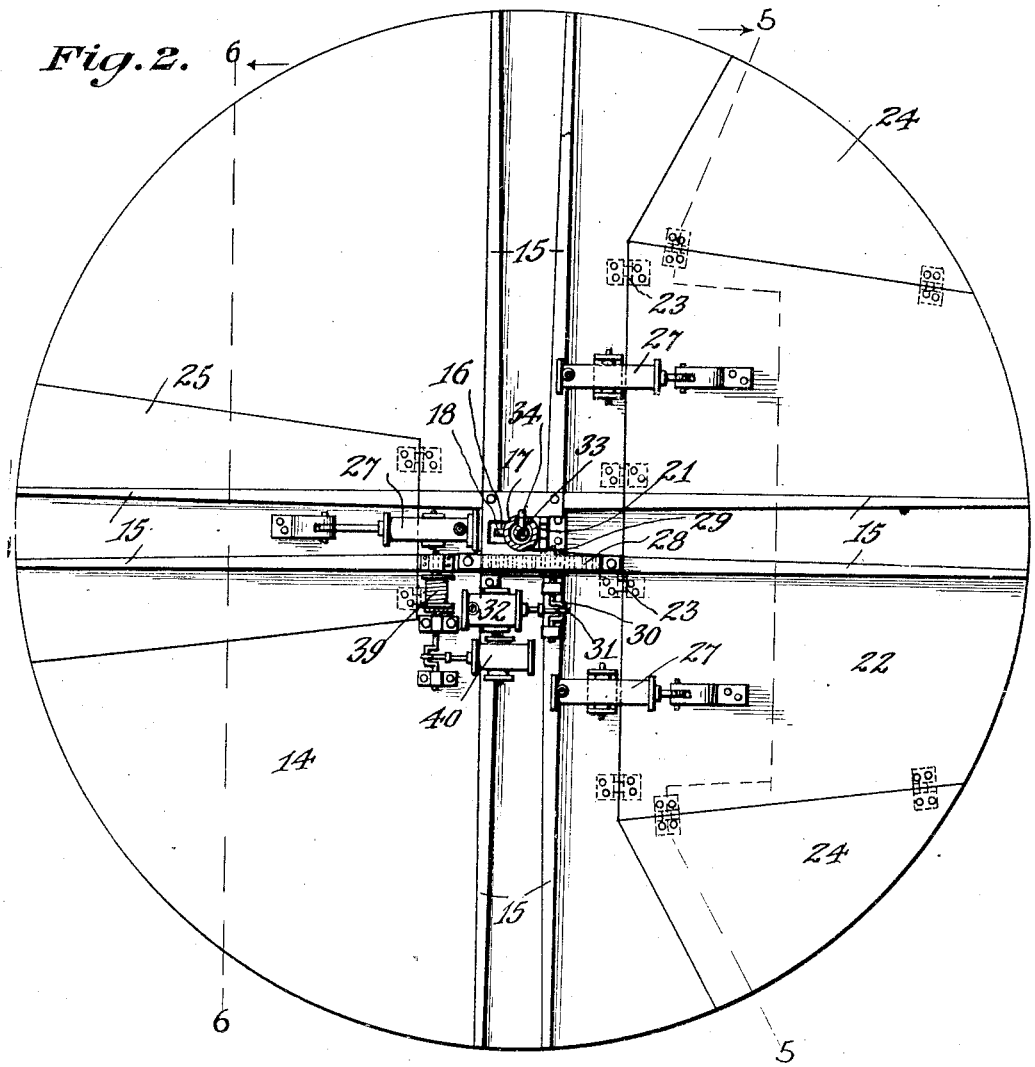
Figure 2 is a sectional view taken on the line 2—2 of Figure 1, looking in the direction of the arrow.
Figure 6:
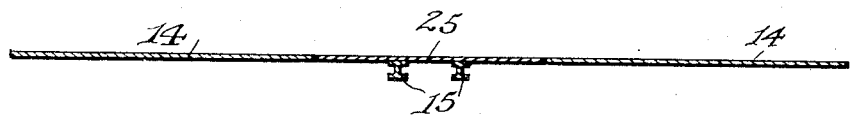
Figure 6 is a similar view, taken on the line 6—6 of Figure 2, looking in the direction of the arrow.

Mounted on the ground immediately above the pit 11 is a table 14, which in the present instance, is shown to be of circular configuration and is adapted to be of such size as to conveniently accommodate an aeroplane, in a manner more fully hereinafter set forth. I will, in the present application, describe the adaptation of the present invention for a single aeroplane or aircraft, but it is to be understood that if desired, the device may be made of sufficient size to accommodate a plurality of aeroplanes or aircrafts. In the present instance, I have shown the bottom of the table 14 as being equipped with two pairs of I-beams 15, which intersect one another at the central part of the table and are preferably arranged in spaced relation as shown to advantage in Figure 2. The base is provided with a central opening 16 which registers with the bore of a cylinder 17, the latter being telescopically mounted in the base 13 and being equipped with a row of vertically extending gear teeth 18. The teeth 18 are engaged in mesh with a pinion 19 driven in any suitable manner, such as by an electric motor 20, as shown in Figure 10. Rotation of the pinion 19 translates vertical movement to the cylinder 17, in an apparent manner. The upper end of the cylinder 17 is engaged with the beams on the bottom of the table 14. Consequently movement of the cylinder imparts a corresponding movement to the table. It will be noted, especially upon reference to Figures 1, 3 and 9 of the drawings, that the table 14 is hingedly engaged to the upper outer periphery of the cylinder 17 through the medium of a hinge 21, to permit tilting of the table in a manner more fully hereinafter set out.

A segment 22 of the table is hingedly mounted, as indicated at 23, to permit movement of the segment upwardly for positioning in front of the nose end of an aeroplane to serve as a wind baffle or deflector for the latter. The ends of the baffle segment 22 are hinged to provide movable wings 24, which serve in the dual capacity of baffles for the terminals of the wings and supports for the segment to retain the latter in a canted or inclined position. In this position the wind is deflected over the top and beyond the sides of the aeroplane in an obvious manner. The table 14 is provided with another movable part, designated 25, which serves as an elevator and support for the tail or aft end of the aeroplane. In Figure 4 of the drawings an aeroplane 26 is shown in superimposed position on the table, the nose end of which is arranged to lie in proximity to the inner face of the baffle segment 22, while the tail end is mounted on the elevator and support 25. As shown by the dotted lines in Figure 1 of the drawings, the tail elevator is adapted to impinge against the tail skid of the aeroplane to permit elevation of the tail end of the craft and correspondingly to urge the wings into a substantially horizontal position to reduce the wind engaging area of the wings to a minimum. It is apparent that when the tail end of the aeroplane is engaged with the ground, or in this case with the table 14, the wings are in a canted position which exposes an appreciable portion thereof to the wind current tending to displace the aeroplane. The present arrangement reduces the impinging surface in the path of the wind to a minimum.

Any desired means may be employed to elevate the segmental baffle 22 and the elevator and support 25. In order to illustrate one mode of operating the baffle and elevator, I have in the drawings shown suitable mechanical means embodying hydraulic cylinders 27, eccentrically mounted on the table 14. A pair of the cylinders are in operative connection with the segmental baffle 22, while a single cylinder is in operative connection with the elevator and support 25. The pistons are operated in the cylinders in a manner well known in the art, to correspondingly move their rods for translating movement to the baffle 22 and elevator 25.

The tilting of the table 14 may also be accomplished by any suitable mechanism, but I have for this purpose in the present instance shown a semi-circular rack 28, eccentrically carried by one of the beams 15, which is engaged in mesh with a pinion 29. The pinion 29 is carried by a crank shaft 30 to which one end of the piston rod 31 is connected, the latter extending from a power cylinder 32, which is eccentrically mounted on one of the beams 15. Consequently, as motion is imparted to the piston rod 31 in a manner well known in the art, the crank shaft 30 is rotated to correspondingly rotate the semi-circular rack 28 and table 14.

In lighter-than-air crafts it is of course, necessary to provide means for anchoring or mooring the craft at an appreciable altitude above the ground or base on which the craft is held. For this purpose I provide a mast 33 which, in the present instance, is shown to consist of a pole or rod having a vertical row of teeth 34 on the periphery thereof which are enmeshed with a pinion 35, the latter being operated in any suitable manner, such as by the electric motor 20. The mast 33 may be elevated either simultaneously with, or separate from the supporting cylinder 17. It is, moreover, apparent that the pole 33 and cylinder 17 may be made in one piece of any desired height or may be made in multiple. The mast 33 is equipped, adjacent the upper terminal thereof, with a pulley 36, which has a cable 37 trained thereabout, one end of which is adapted for securement to a lighter-than-air craft, such as the dirigible designated by the dotted lines 38, in Figure 3. The opposite end of the cable is adapted for engagement with a winch 39, which is rotatably mounted on the bottom face of the table 14, as illustrated to advantage in Figure 2. The winch 39 may be operated in any desired manner. In the present instance, I have shown motive means generally designated 40, which may be used for this purpose in a manifest manner. When the craft 38 is moored to the mast, as indicated in Figure 3, the wind baffle 22 may be turned upwardly into operative position, as shown by the dotted lines in Figure 3 of the drawings, to deflect the wind from direct impingement against the aircraft. If desired, a beacon light 41 may be mounted on top of the mast 33.

When the mechanism is not in use, the table 14 may be engaged with the ground over the pit 11, as shown by the full lines in Figure 3 of the drawings, and the cylinder 17 and mast 33 may be concentrically mounted in the base 13. A door 42 is hingedly mounted on the table to close the opening 16 in the center of the latter, after the cylinder 17 and mast have been telescoped in the base 13.

In use of this device, with the heavier-than-air type of aircraft, the table normally rests on the ground and the aeroplane is brought into position on top of the same. After being so positioned, the aeroplane may be anchored from displacement by the usual wedge blocks and the wind baffle 22 and elevator and support 25 moved into their operative positions, as indicated by the dotted lines in Figure 1. The table 14 may then be elevated to the desired height and is free to rotate under influence of air pressure against the baffle 22 and wings 24, without damage to the landing and launching mechanism and without displacing the aeroplane. When it is desired to take off, the table is elevated to whatever altitude may be required, this varying in different types of aeroplanes. The baffle 22 and elevator 15 are lowered and the table 14 tilted, pursuant to which the wedge blocks are removed and the craft permitted to glide into the atmosphere in an apparent manner. In this way the take off is accomplished without any preliminary run. In anchoring or mooring a lighter-than-air craft, one or more cables, such as the one designated 37 in the drawings, may be lashed to the mast 33 and the craft brought down into proximity to the mast. The occupants of the craft may disembark through the medium of ladders in the customary manner, on the table 14, which can be elevated into a position in proximity to the craft, as indicated by the dotted lines in Figure 3. When the craft is anchored to the mast, the baffle 22 may be operated into the position shown by the dotted lines in Figure 3, to deflect air from the craft with obvious results.

Although I have herein shown specific means for elevating and tilting the table and for elevating the cylinder and mast, it is nevertheless to be understood that these are shown merely to illustrate the application of the invention, since I am aware that various means may be used for this purpose. Moreover, the particular type of table employed is also illustrative and may be varied to better suit operating conditions. It is regarded, however, to be of the essence of importance in the present invention to provide a landing and launching structure which is susceptible of being hoisted to any predetermined altitude to insure safety in anchoring both heavier-than-air and lighter-than-air crafts, and to also insure facility and expedition in the take-off of heavier-than-air crafts.

Various changes may be made in this invention, especially in the details of construction, proportion and arrangement of parts, within the scope of the claims hereto appended.

What is claimed is:

1. An air craft landing and launching device including a table, a portion of which is movable into wind deflecting position and a portion movable to retain the aft part of the craft elevated.

2. An air craft landing and launching device including an air craft receiving table vertically movable and tiltable to permit launching of the craft.

3. A mooring for air crafts including an anchoring table for the craft, a portion of which is hinged to provide a wind barrier for the craft, and means on the table for operating said wind barrier.

4. An air craft landing and launching device including a table to receive a heavier-than-air craft, a mast extending upwardly through the table for engagement with a lighter-than-air craft, means for raising and lowering the table, and means for raising and lowering the mast.

5. An air craft landing and launching device including an air craft supporting structure, means to raise and lower said structure, a portion of said structure being movable into position to deflect wind from the air craft.

6. An aircraft landing and launching device including an aircraft supporting means vertically movable and tiltable, said means being equipped with a wind deflector for the front of the craft and an elevator for the aft end of the craft.

JOHN C. L. RITTER, Jr.